United States Patent
Yamada (10) Patent No.: US 10,363,616 B2
(45) Date of Patent: Jul. 30, 2019

(54) TOOL BODY, INSERT SUPPORT MECHANISM AND CUTTING TOOL

(71) Applicant: TUNGALOY CORPORATION, Yoshima-Kogyodanchi, Iwaki-shi Fukushima (JP)

(72) Inventor: Yosuke Yamada, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 16 days.

(21) Appl. No.: 15/516,950

(22) PCT Filed: Feb. 18, 2016

(86) PCT No.: PCT/JP2016/054659
§ 371 (c)(1),
(2) Date: Apr. 5, 2017

(87) PCT Pub. No.: WO2016/133150
PCT Pub. Date: Aug. 25, 2016

(65) Prior Publication Data
US 2017/0291232 A1    Oct. 12, 2017

(30) Foreign Application Priority Data
Feb. 19, 2015  (JP) ................. 2015-030591

(51) Int. Cl.
*B23C 5/20* (2006.01)
*B23C 5/22* (2006.01)
(Continued)

(52) U.S. Cl.
CPC ............ *B23C 5/22* (2013.01); *B23B 27/1662* (2013.01); *B23B 27/1677* (2013.01); *B23C 5/06* (2013.01);
(Continued)

(58) Field of Classification Search
CPC ... B23C 5/22; B23C 5/2221; B23C 2200/165; B23C 2210/168; B23C 2210/166
See application file for complete search history.

(56) References Cited

U.S. PATENT DOCUMENTS

| 6,238,133 B1 | 5/2001 | DeRoche et al. |
| 2011/0103905 A1 | 5/2011 | Morrison et al. |
| (Continued) | | |

FOREIGN PATENT DOCUMENTS

| JP | 2012-254496 A | 12/2012 |
| WO | 00/23218 A1 | 4/2000 |

OTHER PUBLICATIONS

International Search Report dated Apr. 26, 2016 issued in International (PCT) Application (No. PCT/JP2016/054659).
(Continued)

*Primary Examiner* — Alan Snyder
(74) *Attorney, Agent, or Firm* — Studebaker & Brackett PC (57) ABSTRACT

A cutting tool has an insert receiving pocket provided with a base surface. The base surface has a screw hole, and second and third engagement surfaces which are brought into contact with a first engagement surface formed in the lower surface of the cutting insert, thereby suppressing shifting of the cutting insert during cutting. The base surface is divided into four areas by a first boundary which passes through the screw hole's center point, and a second boundary is perpendicular to the first boundary and also passing though the center point. The second engagement part is formed on the outer side surface side relative to the first boundary and on the base end side relative to the second boundary, and the third engagement part is formed on the outer side surface side relative to the first boundary and on the leading end surface side relative to the second boundary.

18 Claims, 8 Drawing Sheets

(51) Int. Cl.
  *B23C 5/06* (2006.01)
  *B23B 27/16* (2006.01)
(52) U.S. Cl.
  CPC ...... *B23C 5/2221* (2013.01); *B23C 2200/165* (2013.01); *B23C 2210/168* (2013.01)

(56) References Cited

U.S. PATENT DOCUMENTS

| | | |
|---|---|---|
| 2014/0086694 A1 | 3/2014 | Fang et al. |
| 2014/0212226 A1 | 7/2014 | Saji et al. |
| 2015/0165527 A1* | 6/2015 | Roman ................. B23C 5/2213 407/113 |

OTHER PUBLICATIONS

Written Opinion dated Apr. 26, 2016 issued in International (PCT) Application (No. PCT/JP2016/054659).

* cited by examiner

TOOL BODY, INSERT SUPPORT MECHANISM AND CUTTING TOOL

RELATED APPLICATIONS

This is a 371 US National Phase of International Patent Application No. PCT/JP2016/054659, filed Feb. 18, 2016, and published as WO 2016/133150A1 on Aug. 25, 2016, which claims priority to Priority to JP 2015-030591, filed Feb. 19, 2015. The contents of the aforementioned applications are incorporated by reference in their entirety.

TECHNICAL FIELD

The present invention relates to a tool body of a cutting tool which uses a cutting insert, an insert support mechanism and a cutting tool.

BACKGROUND ART

A cutting tool which uses a cutting insert including a circular-arc shaped cutting edge is widely used as it is suited for use in three-dimensional machining of shapes. A ball end mill and a radius end mill, etc., are known as this type of cutting tool. Further, a cutting tool which uses a cutting insert including a circular-arc shaped cutting edge can be used suitably for copy machining, etc., not only as a rotary cutting tool but also as a cutting tool for lathes. In a cutting tool which uses a cutting insert including a circular-arc shaped cutting edge, a peripheral side surface of the cutting insert comprises a cylindrical-shaped or truncated conical-shaped curved face which matches the shape of the cutting edge. Thus, when the curved face of the peripheral side surface of the cutting insert has a higher ratio than a flat face thereof, this is likely to lead to an unstable fixation of the cutting insert, and the cutting insert may be shifted in the rotating direction during cutting. Concerning a reception mechanism as to the rotating direction of a cutting insert, Patent Document 1 discloses a cutting tool. The cutting tool in Patent Document 1 is a cutting tool comprising a cutting insert and a tool body, wherein the tool body includes a leading end surface and an outer side surface leading to the leading end surface and extending from a leading end side to a base end side. The tool body comprises an insert mounting part for mounting a cutting insert on the tool body. The insert mounting part includes a base surface which comes into contact with a lower surface of the cutting insert and a side wall surface which comes into contact with a peripheral side surface of the cutting insert. This cutting tool includes a reception mechanism which receives a rotational moment which acts on the cutting insert such that the cutting insert mounted on the insert mounting part is rotated on the base surface. The reception mechanism includes an engagement part (first engagement part) formed in the lower surface of the cutting insert and an engagement part (second engagement part) formed in the base surface of the insert mounting part and is configured such that these engagement parts are engaged with each other. The second engagement part formed in the base surface corresponds to one specific portion of a surface which defines the first engagement part formed in the lower surface of the cutting insert. When, as viewed from a direction facing the base surface, the base surface is divided into two areas by a boundary (first virtual plane) which passes through the center of gravity of an upper surface of the cutting insert and which is parallel to the longitudinal direction of the cutting tool, the engagement part formed in the base surface is formed on the outer side surface side (opposite side to the side where the side wall surface is located) of the cutting tool. Further, when the base surface is divided into two areas by a boundary (i.e., a second virtual plane orthogonal to the first virtual plane) which passes through the center of gravity of the upper surface of the cutting insert and which is perpendicular to the longitudinal direction of the cutting tool, the engagement part formed in the base surface is formed so as to be located in an area on the base end side of the cutting tool.

CITATION LIST

Patent Document

Patent Document 1: WO02013/051703

SUMMARY

Technical Problem

The cutting tool in Patent Document 1 brings about effects of suppressing shifting of the cutting insert during cutting. However, the first engagement part of the cutting insert and the second engagement part of the insert mounting part come into contact with each other via one location only, and this places limitations on a load which can suppress shifting. In other words, there is still room for improvement in enhancing the cutting conditions for high efficiency machining, and the cutting insert may be shifted when being applied with a large load. If the cutting insert is shifted during cutting, the cutting insert may be abnormally damaged, or the machining accuracy of the workpiece may be deteriorated.

An object of the present invention is to provide a cutting tool having a structure which is capable of stably supporting a rotational moment which acts on a cutting insert and also to provide a tool body of such cutting tool.

Solution to Problem

A tool body of a cutting tool according to the present invention is a tool body including an insert mounting part on which a cutting insert is removably mounted. The tool body includes a leading end surface and an outer side surface extending from the leading end surface to a base end side. The insert mounting part includes an opening provided in at least one of the leading end surface and the outer side surface. The insert mounting part includes a base surface and a side wall surface with which the cutting insert is brought into contact and second and third engagement parts which are formed in the base surface and with which the cutting insert is brought into contact. When, as viewed from a direction facing the base surface, the base surface is divided into four areas by a first boundary L1 which is set so as to pass through substantially a center of the base surface and to extend from the leading end surface side to the base end side, and a second boundary L2 which is set so as to pass through substantially the center of the base surface and to be orthogonal to the first boundary L1, the second engagement part is formed in the first area on the outer side surface side relative to the first boundary L1 and on the base end side relative to the second boundary L2, and the third engagement part is formed in the second area on the outer side surface side relative to the first boundary L1 and on the leading end surface side relative to the second boundary L2.

An insert support mechanism of a cutting tool according to the present invention is an insert support mechanism in a cutting tool in which a cutting insert is removably mounted on an insert mounting part of a tool body, the insert support mechanism being configured so as to receive a rotational moment which acts on the cutting insert so as to rotate the cutting insert on a base surface of the insert mounting part. The cutting insert comprises a first engagement part provided in an end surface which is brought into contact with the base surface. The first engagement part includes at least two specific portions which are separate from each other. The base surface of the tool body is provided with second and third engagement parts so as to be separate from each other, the second and third engagement parts corresponding to the two specific portions. When the cutting insert is mounted on the insert mounting part, one of the specific portions is brought into contact with the second engagement part while the other one of the specific portions does not come into contact with the third engagement part. When the cutting insert receives the rotational moment, at least part of the insert mounting part is elastically deformed, so that the other one of the specific portions is brought into contact with the third engagement part.

A cutting tool according to the present invention comprises a tool body according to the present invention and a cutting insert.

DESCRIPTION OF EMBODIMENTS

Embodiments of the present invention will now be described with reference to the attached drawings.

Figure 1:
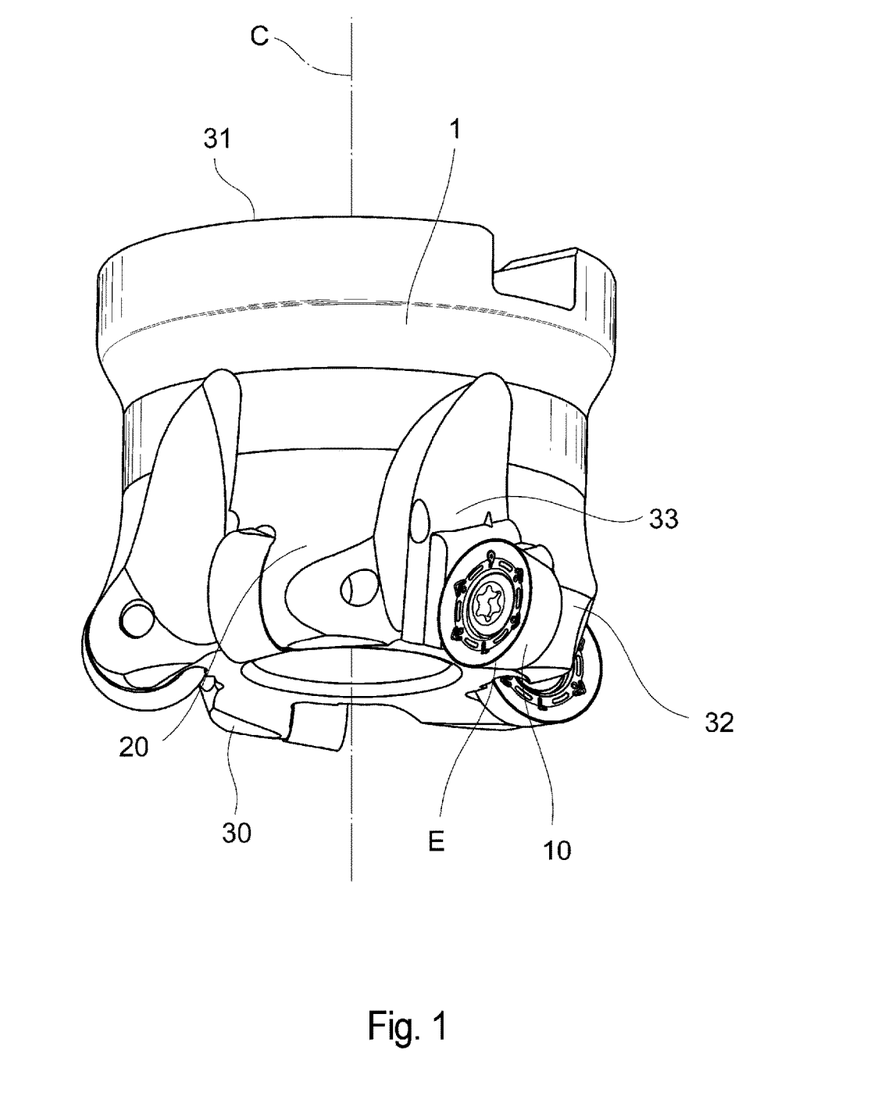
FIG. 1 is a perspective view of a cutting tool according to an embodiment of the present invention.

As shown in FIG. 1, a cutting tool 1 of the present embodiment comprises a cutting insert 10 and a tool body 20 on which the cutting insert 1 is removably mounted. The cutting insert 10 is fixed to the tool body 20 by a fastening screw. The cutting tool 1 is a rotary cutting tool which cuts work while rotating about a rotational axis C extending from a leading end side to a base end side of the tool body 20. Such cutting tool 1 is also referred to as a rotating tool.

As shown in FIGS. 3 to 6, the cutting insert 10 comprises two opposing end surfaces 11, 12 and a peripheral side surface 13 extending therebetween. A cutting edge E is formed along an intersection between the first end surface 12, out of the two end surfaces, and the peripheral side surface 13. The cutting edge E is formed throughout an outer edge of the first end surface 11.

Figure 3:
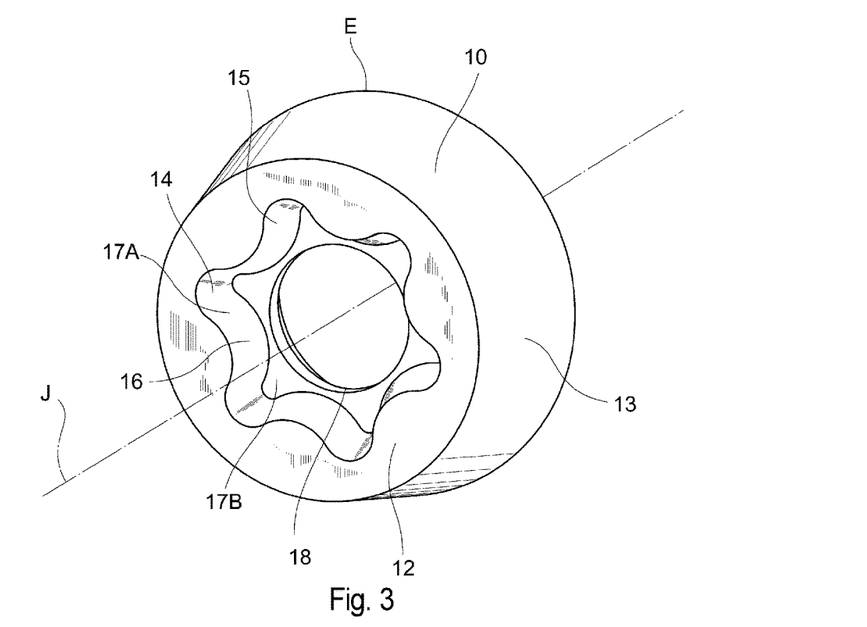
FIG. 3 is a perspective view in which a cutting insert according to an embodiment of the present invention is viewed from the first engagement part side.
Figure 4:
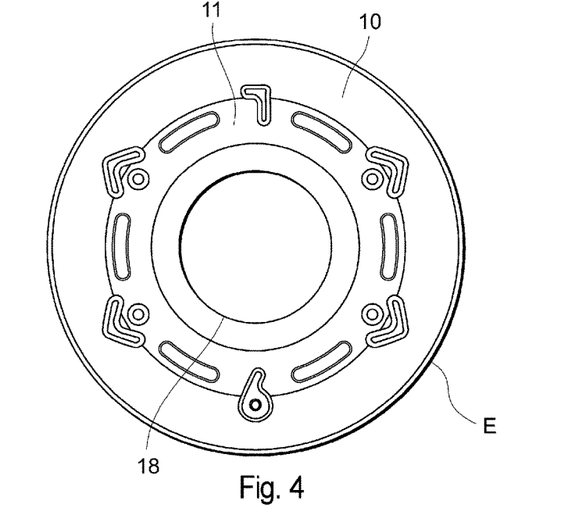
FIG. 4 is a plan view of the cutting insert of FIG. 3.
Figure 5:
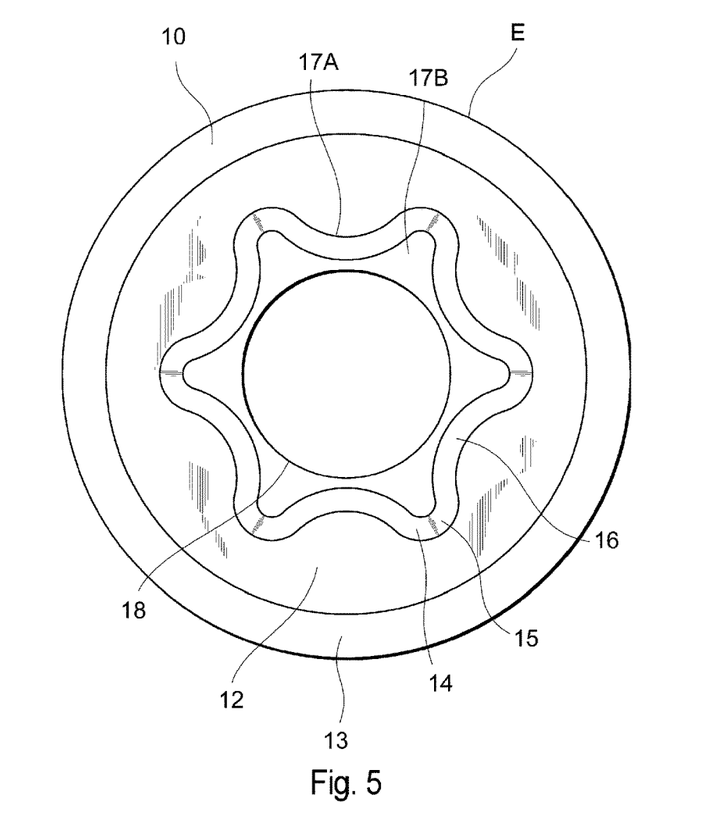
FIG. 5 is a bottom view of the cutting insert of FIG. 3.
Figure 6:
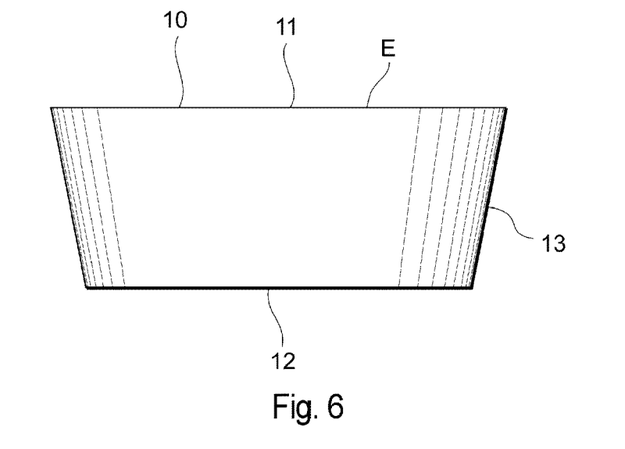
FIG. 6 is a side view of the cutting insert of FIG. 3.

As shown in the plan view of FIG. 4, the contour shape of the first end surface 11 of the cutting insert 10 is substantially circular shaped. In other words, in the cutting edge E, an active cutting edge thereof has a substantially circular-arc shape. The peripheral side surface 13 is given a positive clearance angle, and the cutting insert 10 is a so-called positive-type cutting insert. The contour shape of the second end surface 12 is also substantially circular shaped, similarly to the first end surface 11. As shown in FIG. 3, the cutting insert 10 has a shape of rotational symmetry with respect to a central axis J, which is set so as to extend through the first and second end surfaces 11, 12. As described above, the cutting insert 10 is configured as a so-called circular insert. For the facilitation of understanding the descriptions, the first end surface 11 is referred to as an upper surface 11, and the second end surface 12 is referred to as a lower surface 12. However, the words "upper" and "lower" do not limit the present invention, and the present invention should not be interpreted narrowly based on those words.

The cutting insert 10 is provided with a mounting hole 18 which penetrates the upper surface 11 and the lower surface 12, and a fastening screw is inserted through the mounting hole 18. Due to the shape of rotational symmetry of the cutting insert 10, a central axis of the mounting hole 18 matches the central axis J of the cutting insert 10.

Figure 7:
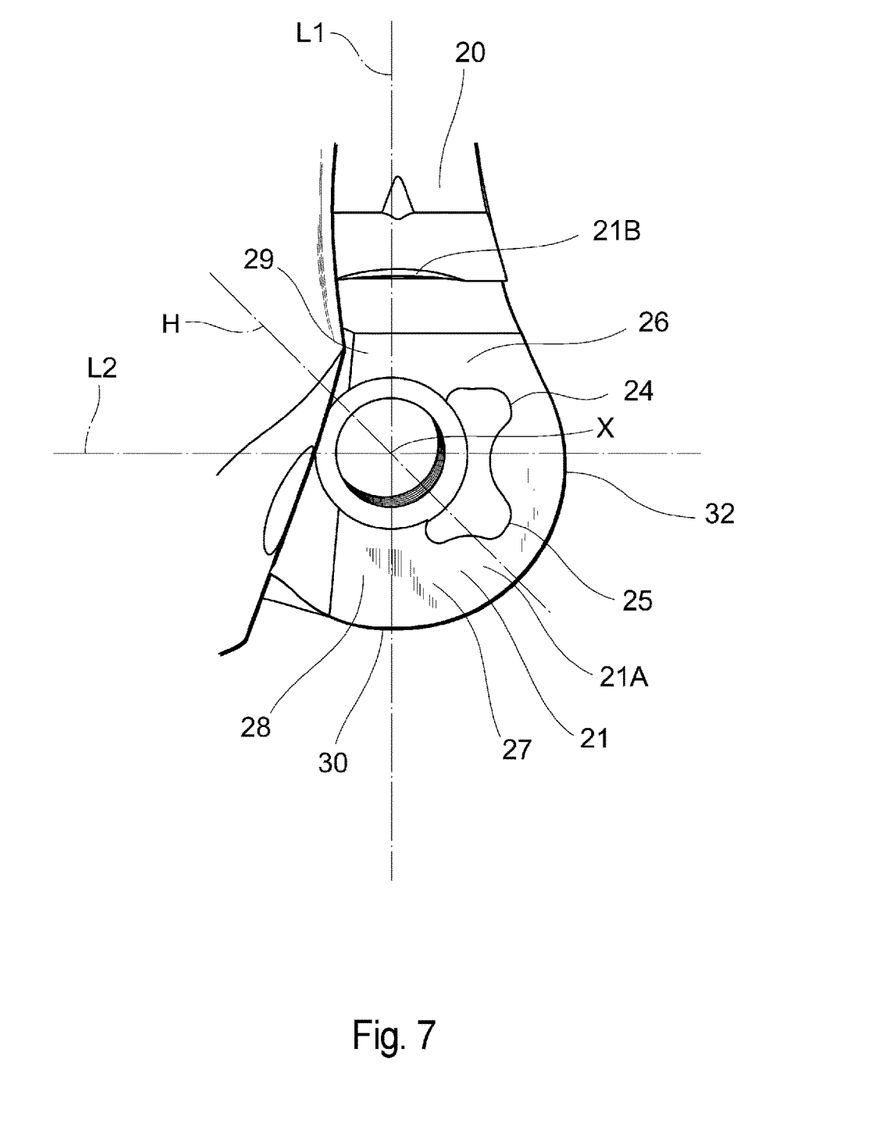
FIG. 7 is a partially enlarged view in which a part in the periphery of the insert mounting part of FIG. 2 is viewed from a direction corresponding to a base surface.

A first engagement part 14 defined by a recess is formed in the lower surface 12 of the cutting insert 10. The first engagement part 14 is defined by a bottom surface part 17B surrounding the mounting hole 18 and a side wall surface 17A rising from an outer peripheral part of the bottom surface part 17B. The bottom surface part 17B extends in a direction orthogonal to the central axis J, and, herein, in particular, extends along a plane orthogonal to the central axis J. The side wall surface 17A is formed from the outer peripheral part of the bottom surface part 17B in a direction of extension of the central axis J. However, the side wall surface 17A is not parallel to the central axis J and is formed so as to be inclined in a predetermined direction at a predetermined angle. Further, the part between the side wall surface 17A and the bottom surface part 17B is given a round (fillet). The side wall surface 17A includes six engagement recessed parts 15, which are each curved in a recessed shape and arranged at regular intervals in a circumferential direction about the central axis J, and also includes six curved projected parts 16, which are each curved in a projecting shape and arranged between adjacent engagement recessed parts 15. The first engagement part 14 has a contour shape of sixfold rotational symmetry with respect to the central axis J of the cutting insert 10. The plurality of engagement recessed parts 15 are regularly arranged around the central axis J, whereby the rotating and mounting of the cutting insert 10 enables a worn out cutting edge portion that cannot be used anymore to be replaced with another cutting edge portion. It should be noted that, when the cutting insert 10 is mounted on an insert mounting part 21, from among the plurality of engagement recessed parts 15, only two specific engagement recessed parts 15 are brought into contact with second and third engagement parts 24, 25, which are described below. Herein, the specific engagement recessed parts 15 are also referred to as specific portions 15. The design which is provided in the upper surface 11 and which includes "L," "6" and a combination of "<" and "○" (see FIG. 4) offers a sign when the rotating and mounting of the cutting insert 10 is performed six times at a maximum. The design formed in the upper surface 11 of the cutting insert 10 is aligned with a mark formed in the tool body 20, whereby it becomes easy for the engagement recessed parts 15 of the lower surface 12 to be aligned with the second and third engagement parts 24, 25. The mark formed in the tool body 20 is referred to as an alignment mark, etc., and may be formed in a simple notch shape, as shown in FIGS. 1, 2 and 7.

As shown in FIG. 1, the tool body 20 includes a leading end surface 30 located at an end on the leading end side and an outer side surface 32 extending from the leading end surface 30 to the base end side. The tool body 20 of the present embodiment further includes a base end surface 31 located at an end on the base end side. The base end surface 31 serves as a mounting surface when the cutting tool 1 is attached to a main shaft of a machining tool. However, the shape is not limited thereto. The shape of the cutting tool 1 on the base end side may be any shape, as long as the cutting tool 1 can be attached to the main shaft of the machining tool directly or via a holding fixture.

Figure 2:
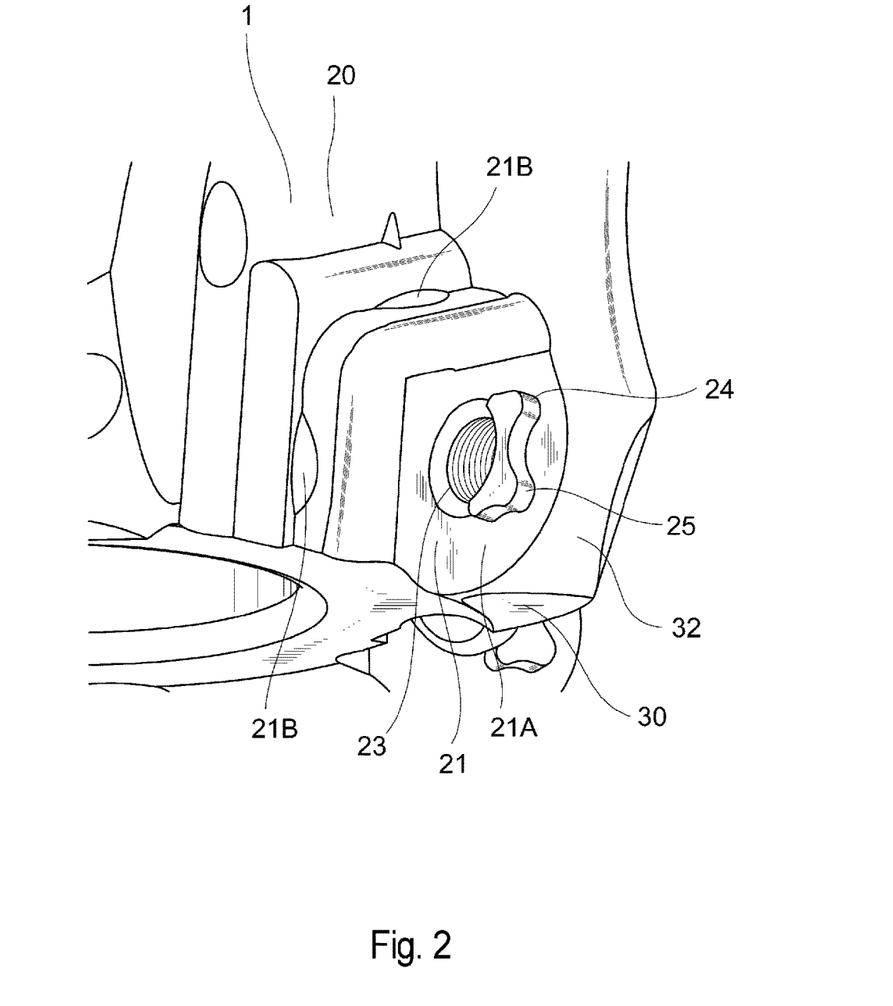
FIG. 2 is a partially enlarged perspective view of a part in the periphery of an insert mounting part after a cutting insert has been removed from the cutting tool of FIG. 1.
Figure 8:
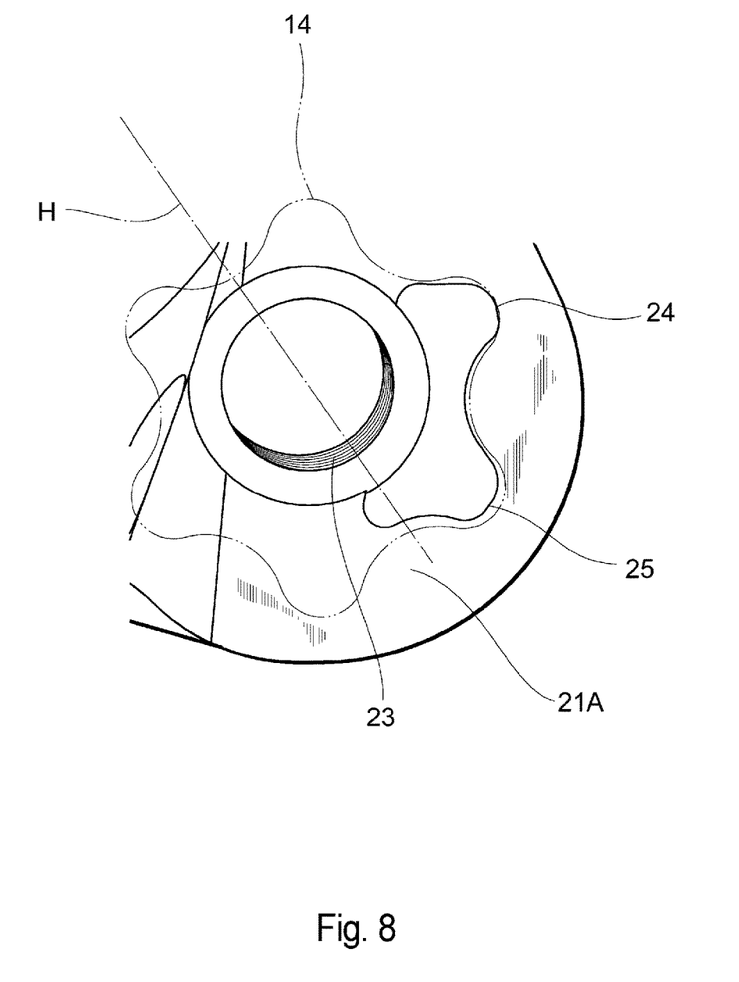
FIG. 8 is a schematic diagram showing a positional relationship between a first engagement part and second and third engagement parts in a state in which a cutting insert is mounted.

As shown in FIG. 2, the tool body 20 comprises the insert mounting part 21 for removably mounting the cutting insert 10 thereon, and the insert mounting part 21 is formed so as to notch part of the leading end surface 30 of the tool body 20. Further, the insert mounting part 21 is formed so as to notch part of the outer side surface 32. In other words, the insert mounting part 21 includes openings respectively leading to the leading end surface 30 and the outer side surface 32. The insert mounting part 21 is defined by a base surface 21A and a side wall surface 21B including a portion which faces toward the leading end surface 30 and a portion which faces toward the outer side surface 32. The side wall surface 21B is provided with two curved surfaces in recessed shapes for supporting the peripheral side surface 13 of the cutting insert. In a narrow sense, such two curved surfaces in recessed shapes alone may be referred to as the side wall surface 21B. Herein, a surface portion which includes such two curved surfaces in recessed shapes and which has a wall shape to intersect the base surface 21A is referred to in its entirety as the side wall surface 21B. A screw hole 23 is formed in the base surface 21A. A fastening screw inserted through the cutting insert 10 is screwed in the screw hole 23 so as to fix the cutting insert 10 to the insert mounting part 21. The screw hole 23 in the cutting tool 1 of the present embodiment is formed so as not to be perpendicular but to be inclined in a predetermined direction at a predetermined angle with respect to the base surface 21A, as shown in FIGS. 7 and 8. Such configuration is employed so as to increase a force holding down the cutting insert 10 toward the side wall surface 21B. However, the configuration is not limited thereto, and the screw hole 23 may be formed so as to be perpendicular to the base surface 21A.

Figure 9:
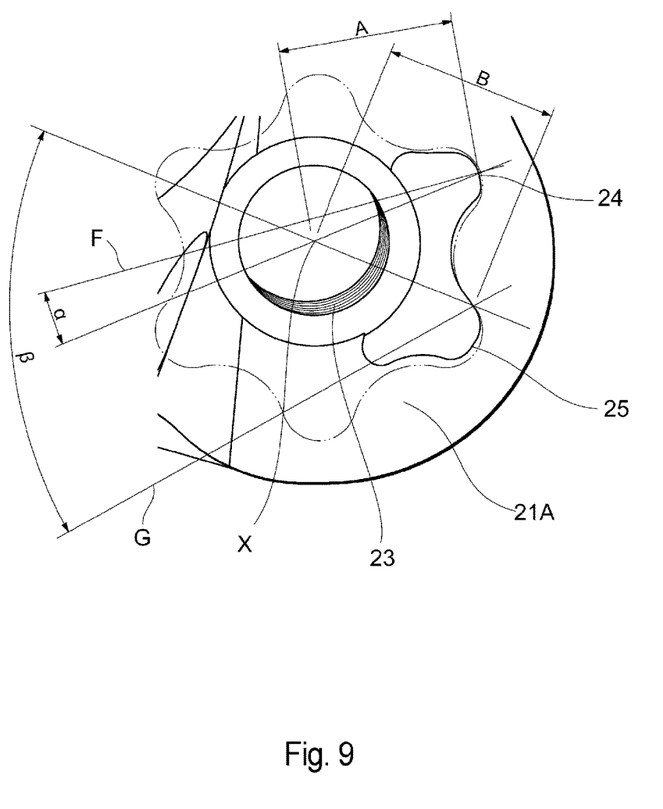
FIG. 9 is a schematic diagram showing a positional relationship between the first engagement part and the second and third engagement parts in a state in which a large load is applied to the cutting insert.

The base surface 21A is provided with the second and third engagement parts 24, 25 each including, as part thereof, a side wall surface curved in a projecting shape. The second and third engagement parts 24, 25 are defined by a protrusion protruding from the base surface 21A and are accommodated in the first engagement part 14 when the cutting insert 10 is mounted on the insert mounting part 21. FIG. 8 is a schematic diagram showing a state in which the cutting insert 10 is mounted on the insert mounting part 21, where only the second engagement part 24 is engaged with one of the specific portions 15, which have been specified in advance. Meanwhile, FIG. 9 is a schematic diagram showing a state in which a large load is applied to the cutting insert 10 during cutting. As shown in FIG. 9, the second and third engagement parts 24, 25 are engaged with the two specific portions 15, which have been specified in advance, from among the above-mentioned plurality of engagement recessed parts 15, thereby functioning to receive a rotational moment which acts on the cutting insert 10 so as to rotate, on the base surface 21A, the cutting insert 10 mounted on the insert mounting part 21. Accordingly, the above-described structure of the cutting tool 1 may be referred to as a reception mechanism.

Explanation will now be made regarding the positions where the second and third engagement parts 24, 25 are formed.

When viewed from a direction facing the base surface 21A (direction perpendicular to the base surface 21A), from among the four areas of the base surface 21A which are defined by a first boundary L1 (parallel to the rotational axis C), which passes through substantially a center of the base surface 21A and which is perpendicular to the leading end surface 30 of the tool body 20, and a second boundary L2 (orthogonal to the rotational axis C), which passes through substantially the center of the base surface 21A and which is parallel to the leading end surface 30 of the tool body 20, the second engagement part 24 is formed in a first area 26 on the outer side surface 32 side and on the base end side (the base end surface 31 side). Further, from among such four areas of the base surface 21A which are defined by the first boundary L1 and the second boundary L2, the third engagement part 25 is formed in a second area 27 on the outer side surface 32 side and on the leading end surface 30 side. It should be noted that, when, as in the cutting tool 1 of the present embodiment, the base surface 21A includes the screw hole 23, the first and second boundaries L1, L2 can be set so as to pass through the center (in particular, the center position along the base surface 21A). A fixing force which fixes the cutting insert 10 is generated by the screwing of a fastening screw in the screw hole 23, and the second and third engagement parts 24, 25 are arranged at suitable positions so as to generate such fixing force. However, when, as in the cutting tool 1 of the present embodiment, in which the screw hole 23 is inclined with respect to the base surface 21A, a central axis H of the screw hole 23 constitutes a line rather than a point when viewed from the direction facing the base surface 21A. In such case, an intersection point X between the central axis H of the screw hole 23 and a virtual plane in which the base surface 21A extends may be used as a center of the screw hole 23. The intersection point X may be referred to as a center point X. In other words, when viewed from the direction facing the base surface 21A, from among the four areas of the base surface 21A which are defined by the first boundary L1, which passes through the center point X and which is perpendicular to the leading end surface 30 of the tool body 20, and the second boundary L2, which passes through the center point X and which is parallel to the leading end surface 30 of the tool body 20, the second engagement part 24 is formed in an area on the outer periphery side and on the base end side, i.e., the first area 26 on the outer side surface 32 side and on the base end surface 31 side. Further, from among the four areas of the base surface 21A which are defined by the first boundary L1 and the second boundary L2, the third engagement part 25 is formed in an area on the outer periphery side and on the leading end side, i.e., the second area 27 on the outer side surface 32 side and on the leading end surface 30 side.

As shown in FIGS. 8 and 9, the second engagement part 24 is engaged with an inner wall of the specific engagement recessed part 15 of the cutting insert 10. The second engagement part 24 is dimensioned so as to be slightly smaller than the engagement recessed part 15 so as to easily enter the engagement recessed part 15. Further, as to the second engagement part 24, the shape of part of a wall surface thereof substantially matches the shape of the engagement recessed part 15 such that the second engagement part 24 is capable of making surface contact with the inner wall of the engagement recessed part 15. An engagement surface of the second engagement part 24 is preferably inclined so as to form an acute angle with a virtual plane parallel to the base surface 21A. In particular, the engagement surface of the second engagement part 24 is preferably inclined so as to have a thin part on its top side and a thick part on its base end side. When the engagement surface of the second engagement part 24 is formed so as to be inclined in such manner, it becomes easier for the second engagement part 24 to enter the engagement recessed part 15, and the strength of the second engagement part 24 is enhanced.

As shown in FIG. 9, when a large load is applied to the cutting insert 10 during cutting, the third engagement part 25 is engaged with an inner wall of the second specific engagement recessed part 15. As shown in FIG. 8, only when the cutting insert 10 is mounted on the tool body 20, the third engagement part 25 does not come into contact with the inner wall of the engagement recessed part 15, and the two face toward each other with a small gap therebetween. When a large load is applied to the cutting insert 10, the third engagement part 25 is brought into contact (engaged) with the inner wall of the engagement recessed part 15 so as to perform its function. The gap when the cutting insert 10 is mounted on the tool body 20 preferably falls within a range of 0.01 mm or more and 0.20 mm or less. The third engagement part 25 is dimensioned so as to be slightly smaller than the engagement recessed part 15 so as to easily enter the engagement recessed part 15. Further, as to the third engagement part 25, the shape of part of a wall surface thereof substantially matches the shape of the engagement recessed part 15 such that the third engagement part 25 is capable of making surface contact with the inner wall of the engagement recessed part 15. An engagement surface of the third engagement part 25 is preferably inclined so as to form an acute angle with the virtual plane parallel to the base surface 21A. In particular, the engagement surface of the third engagement part 25 is preferably inclined so as to have a thin part on its top side and a thick part on its base end side. When the engagement surface of the third engagement part 25 is formed so as to be inclined in such manner, it becomes easier for the third engagement part 25 to enter the engagement recessed part 15, and the strength of the third engagement part 25 is enhanced.

When viewed from the direction facing the base surface 21A, a distance A between the second engagement part 24 and the center of the screw hole 23 is made greater than a distance B between the third engagement part 25 and the center of the screw hole 23 (A>B). When viewed from the direction facing the base surface 21A, a direction of a normal F of the second engagement part 24, which is at a center point of a contact area with the engagement recessed part 15, does not pass through the center of the screw hole 23. A direction of a normal G of the third engagement part 25, which is at a center point of a contact area with the engagement recessed part 15, also does not pass through the center of the screw hole 23. Herein, the contacts between the second and third engagement parts 24, 25 and the engagement recessed parts 15 even encompass predetermined-area (which does not mean a point) contacts, and therefore, normals are set at the center points of such areas. Accordingly, the contacts between the second and third engagement parts 24, 25 and the engagement recessed parts 15 do not exclude point contacts. In the case of such point contacts, normals F, G are set at such points. Further, as described above, the cutting tool 1 of the present embodiment is configured such that the central axis H of the screw hole 23 is inclined with respect to the base surface 21A, and therefore, the center point X is used as the center of the screw hole 23. In other words, when viewed from the direction facing the base surface 21A, the distance A between the second engagement part 24 and the center point X is greater than the distance B between the third engagement part 25 and the center point X. Further, as shown in FIG. 9, when viewed from the direction facing the base surface 21A, the direction of the normal F of the second engagement part 24, which is at the center point of the contact area with the engagement recessed part 15, does not pass through the center point X, and the direction of the normal G of the third engagement part 25, which is at the center point of the contact area with the engagement recessed part 15, also does not pass through the center point X. An angle α in which the direction of the normal F of the second engagement part 24 is shifted from a direction toward the center point X is smaller than an angle β in which the direction of the normal G of the third engagement part 25 is shifted from the direction toward the center point X (α<β).

The base surface 21A preferably has a surface hardness which falls within a range of 48 HRC or more and 68 HRC or less based on Rockwell hardness (JIS Z 2245 or ISO 6508-1). With such hardness, the hardness of each of the second and third engagement parts 24, 25 is preferably adjusted, thereby preventing plastic deformation due to contact and also preventing brittle fracture. In other words, with such surface hardness range of the base surface 21A, during the application of a large load, the third engagement part 25 is brought into contact with the inner wall of the engagement recessed part 15 via elastic deformation.

Next, the effects provided by a cutting tool of the present embodiment will be described. When the cutting insert 10 receives a rotational moment due to cutting resistance, the rotation center is served by a contact part between the second engagement part 24 and the engagement recessed part 15. In the case of the cutting tool 1 of the present embodiment, a rotational moment which acts on the cutting insert 10 generally acts in a right-handed (clockwise) direction when viewed from the direction facing the base surface 21A. In other words, the cutting edge which is in action (active cutting edge) of the cutting tool 1 is arranged so as to be located on the leading end surface 30 side and on the outer side surface 32 side. Since the active cutting edge is located on the leading end surface 30 side of the cutting tool 1 with respect to the contact part between the second engagement part 24 and the engagement recessed part 15, the rotational moment acts in a right-handed direction. Therefore, a unidirectional rotational moment consistently continues to be applied to the cutting insert 10 during cutting. Accordingly, the clamped state of the cutting insert 10 becomes stable.

Further, due to the configuration in which the second engagement part 24 is formed in the first area 26, which is located at a position, on the base end side, which is distant from the active cutting edge involved in cutting, there is an increase in the rotational moment around the contact part between the second engagement part 24 and the engagement recessed part 15 which is generated from cutting resistance. As a result, the second engagement part 24 stably receives a rotational moment which acts on the cutting insert 10, leading to an improvement of the clamping force.

Moreover, the third engagement part 25 is formed in the second area 27 while including a contactable surface (engagement surface) in a direction opposing the rotational moment. As described above, when a large load is applied to the cutting insert 10, the third engagement part 25 is brought into contact with the inner wall of the engagement recessed part 15, to which the third engagement part 25 has become closer via elastic deformation of the insert mounting part 21, so as to perform its function. When a large load is applied to the cutting insert 10, if the second engagement part 24 alone receives the entire load, the second engagement part 24 may be damaged. In view of this, the second engagement part 24 receives a load in cooperation with the third engagement part 25, whereby damage to the second engagement part 24 is suppressed so as to cope with a large load. As described above, the mere configuration in which the cutting insert 10 is mounted on the insert mounting part 21 leaves a small gap between the third engagement part 25 and the cutting insert 10. Such gap is a gap in which, before the occurrence of damage such as plastic deformation to the second engagement part 24, the third engagement part 25 and the cutting insert 10 are brought into contact with each other. In other words, when the second engagement part 24 or the side wall surface 21B is slightly elastic-deformed, the third engagement part 25 and the cutting insert 10 are immediately brought into contact and into engagement with each other. When viewed from the direction facing the base surface 21A, the distance A between the second engagement part 24 and the center of the screw hole 23 is made so as to be greater than the distance B between the third engagement part 25 and the center of the screw hole 23, whereby the gap of the third engagement part 25 is appropriately adjusted. However, as described above, since the cutting tool 1 of the present embodiment is configured such that the central axis H of the screw hole 23 is inclined with respect to the base surface 21A, the center point X is used as the center of the screw hole 23. In other words, when viewed from the direction facing the base surface 21A, the distance A between the second engagement part 24 and the center point X (see FIG. 9) is made so as to be greater than the distance B between the third engagement part 25 and the center point X (see FIG. 9), whereby the gap of the third engagement part 25 is appropriately adjusted.

The third engagement part 25 is closer to the active cutting edge than the second engagement part 24. In other words, the third engagement part 25 is formed in the second area 27 on the leading end surface 30 side. Thus, immediately after the third engagement part 25 starts functioning by being brought into contact with the inner wall of the engagement recessed part 15, it independently receives the force of rotational moment in place of the second engagement part 24. Accordingly, damage to the second engagement part 24 is further suppressed. It should be noted that, the third engagement part 25 in the present embodiment is formed such that the mere mounting of the cutting insert 10 on the tool body 20 does not allow the third engagement part 25 to come into contact with the inner wall of the engagement recessed part 15. However, the configuration is not limited thereto. The third engagement part 25 may be formed such that the mere mounting of the cutting insert 10 on the tool body 20 allows the third engagement part 25 to be brought into contact with the inner wall of the engagement recessed part 15. In such case as well, the second engagement part 24 is formed so as to be brought into contact with the inner wall of the engagement recessed part 15.

As described above, as shown in FIG. 9, when viewed from the direction facing the base surface 21A, the angle α in which the direction of the normal F of the second engagement part 24 is shifted, in a clockwise direction, from the direction toward the center point X is smaller than the angle β in which the direction of the normal G of the third engagement part 25 is shifted, in a counterclockwise direction, from the direction toward the center point X. In other words, the third engagement part 25 comes into contact with part of the engagement recessed part 15 of the cutting insert 10 which is more distant from the center of the engagement recessed part 15 than the second engagement part 24. Further, the shift directions are opposite with respect to the center parts of the engagement recessed parts 15. The respective contact positions of the second engagement part 24 and the third engagement part 25 are shifted from each other with respect to the engagement recessed parts 15, thereby preventing the contact locations of the first engagement part 14 of the cutting insert 10 from being damaged, and as a result, damage to the second engagement part 24 can further be suppressed. Moreover, the third engagement part 25 can be caused to come into contact with the engagement recessed part 15 via its surface which is distant from its center part, i.e., a near-planar surface, and therefore, a wide contact area can be achieved, and the occurrence of a defect such as plastic deformation can be suppressed. Accordingly, a large load during cutting can further be coped with.

As described above, the contour shape of the first end surface 11 of the cutting insert 10 of the present embodiment is substantially circular shaped. Therefore, the peripheral side surface of the cutting insert 10 which is brought into contact with the insert mounting part 21 is configured by a truncated conical-shaped curved face. When the contact surface of the peripheral side surface 13 comprises a truncated conical-shaped curved face, it is difficult for the peripheral side surface 13 to oppose a rotational moment which urges the cutting insert 10 to be rotated on the base surface 21A. Therefore, the engagement between the first engagement part 15 of the cutting insert 10 and the second and third engagement parts 24, 25 of the insert mounting part 21 acts effectively. The contour shape of the cutting insert 10 including the substantially circular-arc shaped cutting edge E is not limited to a substantially circular shape. In other words, the contour shape of the cutting insert 10 in which the contact surface of the peripheral side surface 13 is configured by a substantially cylindrical-shaped or substantially conical-shaped curved face is not limited to a substantially circular shape. When a substantially circular-arc shaped contour portion of the cutting insert 10 occupies between 30% or more and 100% or less of the entire contour shape thereof, the insert support mechanism of the present invention attains a significantly high degree of effectiveness. Further, when the cutting insert 10 is provided with a plurality of main cutting edges each having a contour shape of an arc equal to or greater than a quarter circular arc, the insert support mechanism of the present invention attains a significantly high degree of effectiveness. It should be noted that an arc equal to or greater than a quarter circular arc refers to a circular arc with a central angle of 90° or greater.

As described above, in the cutting tool 11 of the present embodiment, the positions where the second and third engagement parts 24, 25 are formed have been devised such that the first engagement part 14 formed in the second end surface 12 of the cutting insert 10 is engaged, at two or more locations, with the second and third engagement parts 24, 25 formed in the base surface 21A of the insert mounting part

21; therefore, the rotation (shifting) of the cutting insert 10 can be suppressed effectively even when the cutting insert 10 receives a large load, and, at the same time, the effect in which the side wall surface 21B of the insert mounting part 21 suppresses the rotation of the cutting insert 10 is maximized, whereby a large load during cutting can be coped with. As a result, abnormal damage to the cutting insert 1 can be suppressed, and the machining accuracy of the workpiece can be improved.

Figure 10:
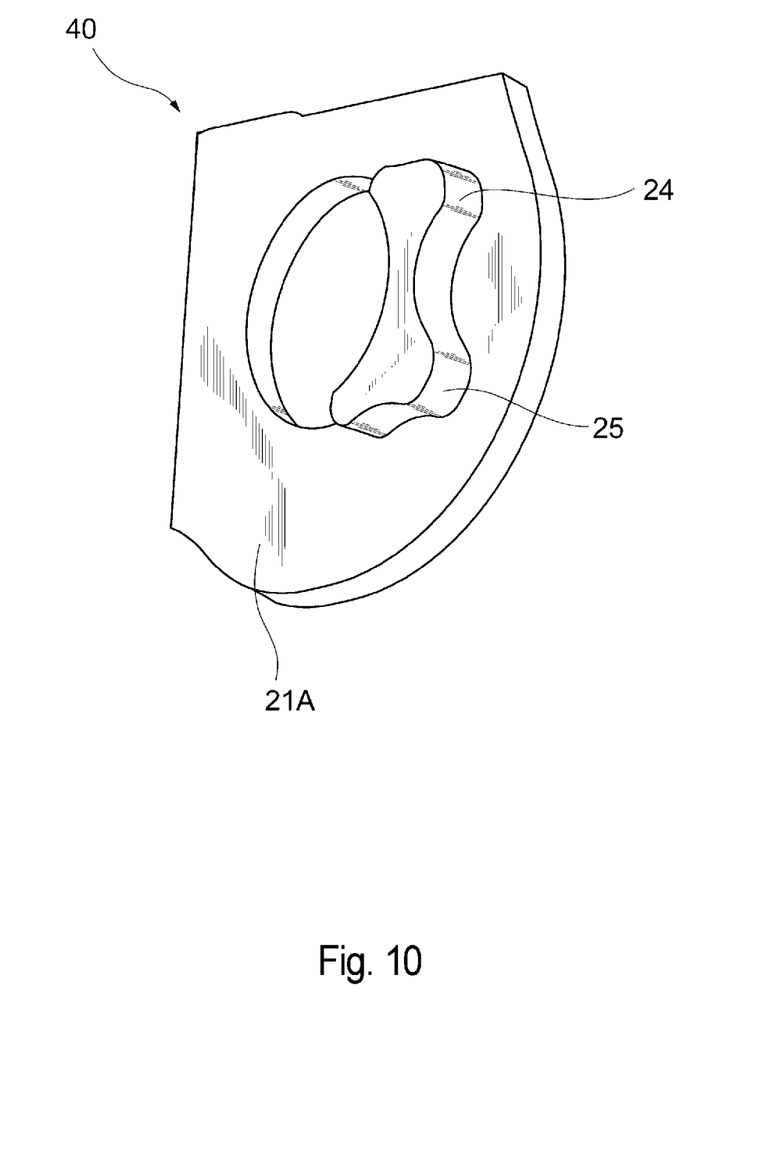
FIG. 10 is a perspective view of a shim provided in an insert mounting part of a cutting tool according to another embodiment of the present invention.

In the present embodiment, a shim is not used for the insert mounting part 21, and the tool body 20 is directly provided with the second and third engagement parts 24, 25. However, in the present invention, the configuration is not limited thereto. The present invention can also be applied to a case in which a shim 40 as shown in FIG. 10 is used and in which the shim 40 is provided with the second and third engagement parts 24, 25. Specifically, the shim 40 is configured by providing the second and third engagement parts 24, 25 on a surface of a plate-like shim body which defines the base surface 21A with which the cutting insert 10 is brought into contact. By providing the shim 40 with the second and third engagement parts 24, 25, it becomes easier to form the second and third engagement parts 24, 25 in more complicated shapes. Further, when the second and third engagement parts 24, 25 are damaged, the replacement of the shim 40 allows the tool life of the cutting tool 1 to be prolonged. The shim 40 may be provided with a hole for fixing the shim 40 to the tool body 20 by a screw, etc. The use of a fastening means such as a screw makes it easy to perform replacement after the shim 40 is fixed to the tool body 20. The shim 40 can be fixed to the tool body 20 not only by employing a mechanical means, such as a fastening means, a clamp or an engagement between a recessed part and a projected part, but also by utilizing elastic deformation or thermal deformation like press fitting or shrink fitting or employing a non-mechanical means like bonding, welding or adhesion.

The cutting tool 1 of the present invention is not limited to the above-described embodiment. Such embodiment has been described regarding the case in which the first engagement part 14 is defined by the recess formed in the lower surface 13 of the cutting insert 10 and in which the second and third engagement parts 24, 25 are defined by the protrusion which is formed in the base surface 21A and which is accommodated in the recess so as to be capable of being engaged with part of the side wall surface which defines such recess. However, conversely to such embodiment, it is also possible to employ a configuration in which a first engagement part is defined by a protrusion formed in the lower surface 13 of the cutting insert 10 and in which second and third engagement parts are defined by a recess including an engagement portion which accommodates the protrusion so as to be capable of being engaged with part of a side wall surface which defines such protrusion (not shown).

The second and third engagement parts 24, 25 in the present embodiment are formed as parts of one protrusion, but such two engagement parts 24, 25 may also be provided as completely independent protrusions. Similarly, the first engagement part may be divided into completely independent multiple recessed parts rather than being configured as one recessed part. However, when the second and third engagement parts 24, 25 are formed as parts of one protrusion, such configuration makes it possible to form the two engagement parts 24, 25 in a small space and also achieves an increased strength of such protrusion part, and this can prevent the occurrence of plastic deformation, etc.

As for the shape of a cutting insert, it is possible to employ a positive type but also a negative type in which a peripheral side surface thereof is not given a positive clearance angle. Further, there is no particular limitation placed on the entire shape of the cutting insert, and the present invention can also be applied to cutting inserts having various shapes. For example, the present invention can also be applied to cutting inserts respectively including peripheral side surfaces with various curved shapes, including an elliptically curved shape, an asymmetrically curved shape, and others.

The contour shape of the recess which defines the first engagement part 14 provided in the cutting insert may be a simple geographic shape such as a circle or a square. In such case, such cutting insert has n-fold (where n is a natural number of 2 or higher) rotational symmetry around an axis thereof, and if the cutting insert is provided with a plurality of engagement recessed parts 15, it is possible to use a plurality of cutting edge portions of the cutting insert. The first engagement part 14 is preferably formed in a shape which allows the first engagement part 14 to be brought into contact with the second and third engagement parts 24, 25 via as wide an area as possible. When the recess has a shape including the engagement recessed parts 15 as in the present embodiment, no particular limitation is placed on the number of the engagement recessed parts 15. The number of the engagement recessed parts 15 may be more or less than six, which is the number indicated in the present embodiment. The number of the engagement recessed parts 15 may be adjusted as appropriate, depending on the shape of the workpiece and the cutting conditions. However, the number of the engagement recessed parts 15 is preferably between three or more and ten or less. When the number of the engagement recessed parts 15 is above ten, the size of the engagement recessed part 15 is reduced compared with the size of the cutting insert 10, and this makes it difficult for a rotational moment to be sufficiently received. When two or less engagement recessed parts are employed, the number of corresponding cutting edges is accordingly two or less, and therefore, it is possible to employ a structure in which the peripheral side surface 13 of the cutting insert 10 receives a rotational moment without the use of the engagement recessed parts 15.

The present embodiment has been described regarding the case in which the cutting insert 10 is fixed by a fastening screw. However, the present invention is not limited thereto and can also be applied to a case in which another clamping method with the use of a wedge, a presser piece, etc., is used to fix the cutting insert 10. However, the reception mechanism of the present invention exerts the most significant effects when the cutting insert 10 is fixed by a fastening screw.

In the insert mounting part 21 in the present embodiment, the leading end surface 30 of the cutting tool 1 and the outer side surface 32 thereof are both provided with openings, but the configuration is not limited thereto. In the insert mounting part 21, either the leading end surface 30 of the cutting tool 1 or the outer side surface 32 thereof may be provided with an opening. The intersecting edge portion, which corresponds to such opening, between the upper surface of the cutting tool 1 and the peripheral side surface thereof can function as an active cutting edge. In other words, the position of the active cutting edge and the direction of arrangement may be adjusted as appropriate, and the opening of the insert mounting part 21 may be arranged, depending on the shape of the workpiece and the cutting conditions. Even in such case, the four areas (26, 27, 28, 29) viewed from the direction facing the base surface 21A, are set by the first boundary L1 (parallel to the rotational axis C), which passes through substantially the center of the base surface 21A and which is perpendicular to the leading end surface 30 of the tool body 20, and the second boundary L2 (orthogonal to the rotational axis C), which passes through substantially the center of the base surface 21A and which is parallel to the leading end surface 30 of the tool body 20.

In the above-described embodiments, the present invention has been described specifically in a given way, but the present invention is not limited to the described embodiments. It should be appreciated that various alterations and changes can be made to the present invention without departing from the gist and scope of the invention defined in the claims. The present invention encompasses all kinds of modifications, applications and equivalents that are encompassed by the idea of the present invention defined by the scope of the claims.

REFERENCE SIGNS LIST

1 Cutting tool
10 Cutting insert
11 First end surface (upper surface)
12 Second end surface (lower surface)
13 Peripheral side surface
14 First engagement part
15 Engagement recessed parts
16 Curved projected parts
17A Side wall surface
17B Bottom surface part
18 Mounting hole
J Central axis
E Cutting edge
20 Tool body
21 Insert mounting part
21A Base surface
21B Side wall surface
23 Screw hole
H Central axis
X Center point
24 Second engagement part
25 Third engagement part
26 First area
27 Second area
28 Third area
29 Fourth area
30 Leading end surface
31 Base end surface
32 Outer side surface
33 Chip pocket
40 Shim
C Rotational axis
L1 First boundary
L2 Second boundary
A Distance between the second engagement part and the center point X
B Distance between the third engagement part and the center point X
F Normal of the second engagement part which is at the center point of the contact area with the insert engagement recessed part
G Normal of the third engagement part which is at the center point of the contact area with the insert engagement recessed part
α Angle formed by the normal of the second engagement part and the direction toward the center point
β Angle formed by the normal of the third engagement part and the direction toward the center point

What is claimed is:

1. A tool body including an insert mounting part for removably mounting a cutting insert, wherein:
the tool body includes a leading end surface and an outer side surface extending from the leading end surface to a base end side;
the insert mounting part includes an opening provided in at least one of the leading end surface and the outer side surface; and
the insert mounting part includes a base surface and a side wall surface, and second and third engagement parts which are formed in the base surface and with which the cutting insert is brought into contact, and wherein
when, as viewed from a direction facing the base surface, the base surface is divided into four areas by a first boundary which is set so as to pass through substantially a center of the base surface and to extend from the leading end surface side to the base end side, and a second boundary which is set so as to pass through substantially the center of the base surface and to be orthogonal to the first boundary,
the second engagement part is formed in the first area on the outer side surface side relative to the first boundary and on the base end side relative to the second boundary,
the third engagement part is formed in the second area on the outer side surface side relative to the first boundary and on the leading end surface side relative to the second boundary,
the tool body includes a screw hole which is formed in the base surface so as to be screwed in by a fastening screw which fixes the cutting insert,
when an intersection point between a central axis of the screw hole and a virtual plane in which the base surface extends is regarded as a center point,
substantially the center of the base surface serves as the center point, and
when viewed from the direction facing the base surface, a first distance between the second engagement part and the center point is greater than a second distance between the third engagement part and the center point.

2. The tool body according to claim 1 wherein the insert mounting part includes openings provided in both the leading end surface and the outer side surface.

3. The tool body according to claim 1, wherein an engagement surface of each of the second and third engagement parts is inclined so as to form an acute angle with a virtual plane parallel to the base surface.

4. The tool body according to claim 1, wherein:
when viewed from the direction facing the base surface, a direction of a normal of the second engagement part does not pass through the center point;
a direction of a normal of the third engagement part does not pass through the center point; and
a first angle in which the direction of the normal of the second engagement part is shifted from a direction toward the center point is smaller than a second angle in which the direction of the normal of the third engagement part is shifted from the direction toward the center point.

5. The tool body according to claim 1, wherein the second and third engagement parts are formed as parts of one protrusion part.

6. The tool body according to claim 1, wherein:
the insert mounting part includes a shim which defines the base surface with which the cutting insert is brought into contact; and
the second and third engagement parts are formed in the shim.

7. A cutting tool in which a cutting insert is removably mounted on an insert mounting part of a tool body, the cutting tool having an insert support mechanism configured to receive a rotational moment which acts on the cutting insert so as to rotate the cutting insert on a base surface of the insert mounting part, wherein:
the cutting insert comprises a first engagement part provided in an end surface which is brought into contact with the base surface, the first engagement part including at least two specific portions which are separate from each other;
the base surface of the tool body is provided with second and third engagement parts so as to be separate from each other, the second and third engagement parts corresponding to the two specific portions;
when the cutting insert is mounted on the insert mounting part, one of the specific portions is brought into contact with the second engagement part while the other one of the specific portions does not come into contact with the third engagement part; and
when the cutting insert receives the rotational moment, at least part of the insert mounting part is elastically deformed, so that the other one of the specific portions is brought into contact with the third engagement part.

8. The cutting tool according to claim 7, wherein, when, as viewed from a direction facing the base surface, the base surface is divided into four areas by a first boundary which is set so as to pass through substantially a center of the base surface and to extend from a leading end surface side of the cutting tool to a base end side and a second boundary which is set so as to pass through substantially the center of the base surface and to be orthogonal to the first boundary, and when the cutting insert is mounted on the insert mounting part, and the second area is then located on a back side of an active working edge of the cutting insert,
the third engagement part is located in the second area.

9. The cutting tool according to claim 7, wherein:
the insert support mechanism includes a screw hole formed in the base surface so as to be screwed in by a fastening screw which fixes the cutting insert; and
when an intersection point between a central axis of the screw hole and a virtual plane in which the base surface extends is regarded as a center point,
substantially the center of the base surface serves as the center point.

10. A cutting tool comprising:
the tool body according to claim 1; and
a cutting insert releasably mounted in the insert mounting part, the cutting insert comprising a first engagement part provided in an end surface which is brought into contact with the base surface.

11. The cutting tool according to claim 10, wherein:
the cutting insert includes first and second end surfaces and a peripheral side surface which connects the first and second end surfaces;
when viewed from a direction facing the first end surface, the cutting insert includes a circular-arc shaped contour portion; and
the circular-arc shaped contour portion occupies between 30% or more and 100% or less of the entire contour shape of the cutting insert.

12. The cutting tool according to claim 10, wherein:
the cutting insert includes first and second end surfaces and a peripheral side surface which connects the first and second end surfaces;
when viewed from the direction facing the first end surface, a cutting edge of the cutting insert includes a circular-arc shaped main cutting edge; and
the main cutting edge is formed in a contour shape of an arc equal to or greater than a quarter circular arc.

13. The cutting tool according to claim 10, wherein:
the first engagement part is defined by a recess; and
the second and third engagement parts are defined by a protrusion which is accommodated in the recess so as to be capable of being engaged with part of a side wall surface which defines the recess.

14. The cutting tool according to claim 10, wherein:
the first engagement part is defined by a protrusion; and
the second and third engagement parts are defined by a recess which accommodates the protrusion so as to be capable of being engaged with part of a side wall surface which defines the protrusion.

15. A tool body having a rotational axis, a leading end surface, an outer side surface extending from the leading end surface to a base end surface, and an insert mounting part for removably mounting a cutting insert, the insert mounting part opening to at least one of the leading end surface and the outer side surface, wherein:
the insert mounting part comprises:
a base surface extending in a virtual plane;
a side wall surface;
a screw hole formed in the base surface, the screw hole having a central axis which intersects the virtual plane at a center point; and
second and third engagement parts formed on the base surface and with which the cutting insert is brought into contact;
when, viewed from a direction facing the base surface, the base surface is divided into four areas by a first boundary which is parallel to the rotational axis and passes through the center point, and a second boundary which is perpendicular to the first boundary and also passes though the center point;
the second engagement part is formed in the first area on the outer side surface side relative to the first boundary and on the base end surface side relative to the second boundary;
the third engagement part is formed in the second area on the outer side surface side relative to the first boundary and on the leading end surface side relative to the second boundary; and
when viewed from the direction facing the base surface, a first distance between the second engagement part and the center point is greater than a second distance between the third engagement part and the center point.

16. The tool body according to claim 15, wherein:
when viewed from the direction facing the base surface, a direction of a normal of the second engagement part does not pass through the center point, and a direction of a normal of the third engagement part does not pass through the center point; and
a first angle in which the direction of the normal of the second engagement part is shifted from a direction toward the center point is smaller than a second angle in which the direction of the normal of the third engagement part is shifted from the direction toward the center point.

17. A cutting tool comprising:
the tool body according to claim 15; and
the cutting insert releasably mounted in the insert mounting part, the cutting insert comprising a first engagement part provided in an end surface which is brought into contact with the base surface.

18. The cutting tool according to claim 17, wherein:
the cutting insert's first engagement part includes at least two specific portions which are separate from each other;
the base surface's second and third engagement parts are separate from each other, the second and third engagement parts corresponding to the two specific portions;
when the cutting insert is mounted on the insert mounting part, one of the specific portions is brought into contact with the second engagement part while the other one of the specific portions does not come into contact with the third engagement part; and
when the cutting insert receives a rotational moment, at least part of the insert mounting part is elastically deformed, so that the other one of the specific portions is brought into contact with the third engagement part.

* * * * *